United States Patent [19]

Heathcoat

[11] Patent Number: 4,988,023

[45] Date of Patent: Jan. 29, 1991

[54] MODIFIED SPARE TIRE CARRIER SECURITY DEVICE

[76] Inventor: Ellis W. Heathcoat, P.O. Box 14566, Odessa, Tex. 79768

[21] Appl. No.: 326,713

[22] Filed: Mar. 21, 1989

[51] Int. Cl.$^5$ .............................................. B62D 43/04
[52] U.S. Cl. ..................... 224/42.210; 224/42.25; 224/42.23; 224/42.24; 224/42.41; 70/259; 211/23; 414/463; 296/37.3
[58] Field of Search ............... 224/42.03 R, 42.03 A, 224/42.06, 42.07, 42.08, 42.12, 42.21, 42.23, 42.25, 42.41, 42.43, 42.44; 70/259, 260; 211/23; 296/37.3; 414/463

[56] References Cited

U.S. PATENT DOCUMENTS

| | | | |
|---|---|---|---|
| 1,625,901 | 4/1927 | Lay | 224/42.25 X |
| 3,330,431 | 7/1967 | Knecht | 224/42.23 X |
| 3,372,821 | 3/1968 | Podhajsky | 414/463 |
| 3,865,264 | 2/1975 | Kuhns | 414/463 |
| 4,095,709 | 6/1978 | Eller | 414/463 |
| 4,174,797 | 11/1979 | Yasue et al. | 224/42.21 |
| 4,492,506 | 1/1985 | Hoagland et al. | 414/463 |
| 4,526,021 | 1/1985 | Princell | 224/42.41 |
| 4,795,302 | 1/1989 | Dalton | 414/463 X |

Primary Examiner—Ernest G. Cusick
Attorney, Agent, or Firm—Marcus L. Bates

[57] ABSTRACT

A vehicle has a rear bumper and a spare tire carrier. A retracting mechanism is actuated by a rotatable shaft which extends toward and is spaced from the rear bumper. An aperture through the rear bumper enables a crank to be inserted therethrough and into engagement with the rotatable shaft. A drive device is inserted through the bumper and into the shaft where it is attached in lieu of the previous crank. A marginal end of the drive device extends through the bumper and is a polygon in cross-section configuration. A rotatable housing is removably locked about the polygon so that the polygon is inaccessible and therefore cannot be rotated when the rotatable housing is engaged by a rotatable means. When the housing is removed, the polygon is engaged by a crank and rotated, thereby rotating the rotatable shaft whereupon the spare tire is extended from the tire carrier.

18 Claims, 2 Drawing Sheets

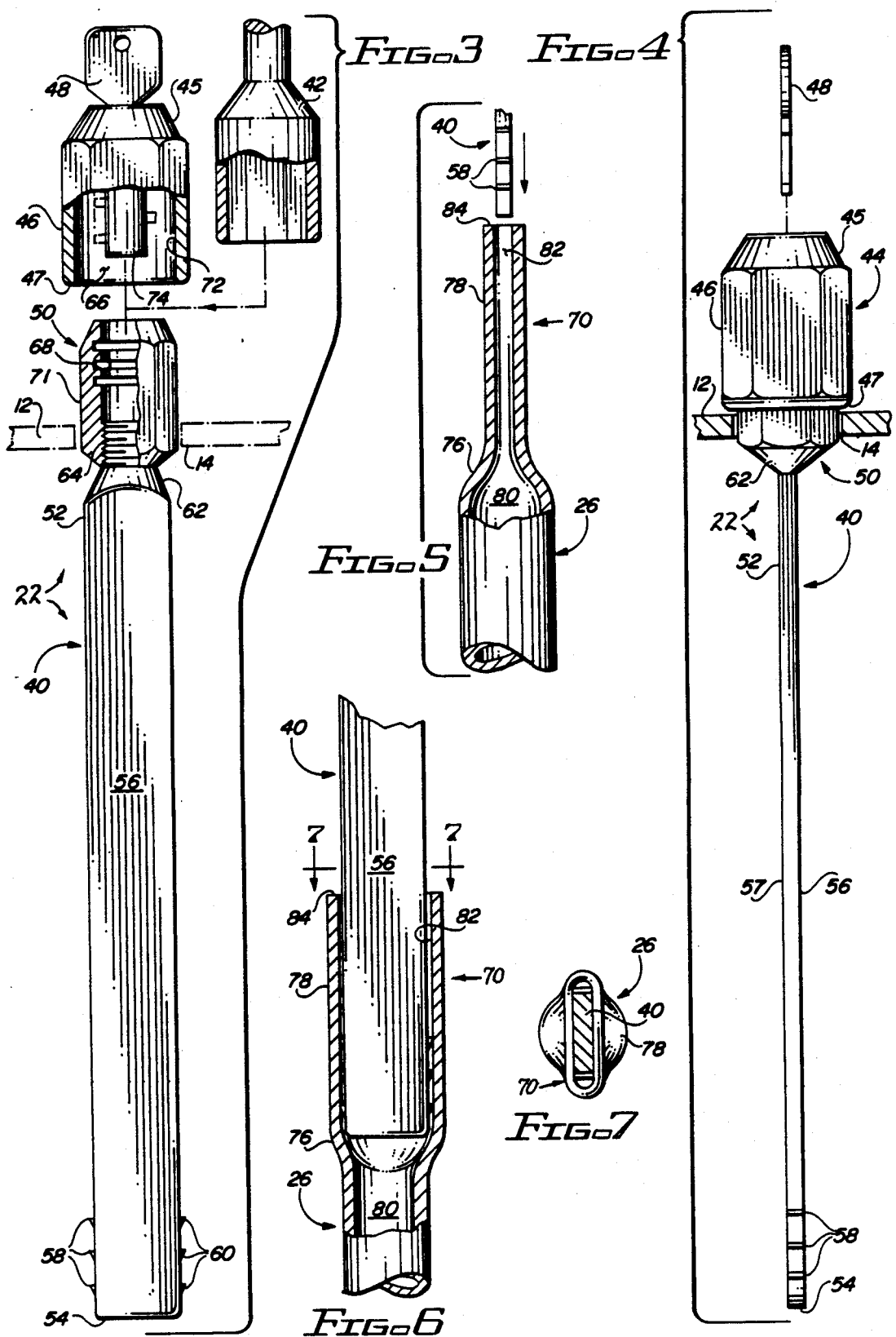

MODIFIED SPARE TIRE CARRIER SECURITY DEVICE

BACKGROUND OF THE DISCLOSURE

A spare tire mounted on a wheel occupies a considerable volume and is completely useless until needed. When a tire is changed, the dirty, old tire and wheel are usually stored within the vehicle. This soils the interior of the vehicle as well as personal goods in proximity thereof.

Podhajsky Patent No. 3,372,821 is a clever solution to many of these problems and reference is made to the spare tire holder disclosed therein. Reference is also made to Combs Patent No. 4,537,555; Lowe Patent No. 1,942,176; Wise Patent No. 1,915,564 and Van Sickel Patent No. 1,854,495 for various different lock devices used in conjunction with spare tires mounted on a wheel.

A 1989 Chevrolet pickup truck has a spare tire carrier and a retracting mechanism actuated by a rotatable shaft extending towards the rear bumper thereof. A crank is extended through an aperture in the bumper and into engagement with a free end of the shaft so that the crank can impart rotation into the shaft and thereby lift a wheel mounted spare tire into the spare tire carrier. Theft of a spare tire and wheel from this type tire carrier has become so prevalent that there is now available an extension device similar to Podhajsky '821 that can be exended through the bumper aperture into engagement with the shaft, and the free end of the extension device locked respective to the bumper. This arrangement is objectionable to some because they find it is unsightly, and that the loose lock rattles, and therefore makes undesirable noises while driving along rough roads. Moreover, there are those rascals who can disable an ordinary lock in a few seconds time.

It would be desirable to be able to modify or retrofit existing spare tire carriers, such as found on a 1989 Chevrolet pickup truck, by the provision of a security drive device which can be simply inserted through the hole in the truck bumper and thereafter driving one marginal end of the device into the shaft, while the other marginal end is retained within the bumper hole and extends slightly therefrom where it is readily available for actuation by a crank device. Such an apparatus desirably would have lock means associated therewith which provides security for the spare tire and wheel.

SUMMARY OF THE INVENTION

The improvement of the present invention comprehends a security device having an oblated end opposed to a locking end. A rotatable housing covers the locking end and a lock means is provided for removing the rotatable housing from the locking end.

The security device is used in combination with a prior art spare tire holder such as may be formed within a vehicle chassis for receiving a wheel mounted spare tire therein for use on the vehicle. A prior art shaft driven retracting mechanism raises the spare tire into the holder when the shaft is rotated in one direction and lowers the spare tire from the holder when the shaft is rotated in the other direction. The shaft of the shaft driven mechanism extends towards and is spaced from the rear bumper of the vehicle. A crank can be inserted through the hole into engagement with the terminal end of the shaft and the shaft rotated in either direction.

The oblated end of the security device is extended through the hole of the bumper and into fixed relationship respective to the marginal end of the prior art shaft. The housing preferably resides within the hole of the bumper and can be freely rotated without imparting rotational motion into the security device and accordingly, the shaft driven retracting mechanism cannot be operated until the housing has been removed from the security device.

In the preferred form of the invention, the security device is inserted through the hole of the bumper and the oblated end is driven into the marginal end of the prior art shaft thereby locking the shaft and security device to one another. When it is desired to raise or lower a wheel mounted spare tire respective to the vehicle holder, a key is inserted in the end of the security device, the rotatable housing is telescopingly removed from the marginal free end of the security device, and a crank engages the marginal end and enables rotation of the security device which in turn rotates the shaft and thereby raises or lowers the spare tire from the holder depending upon the direction of rotation of the shaft.

Accordingly, a primary object of the present invention is the provision of a security device used in combination with a prior art retracting mechanism of a spare tire carrier which prevents the operating mechanism to be selectively disabled or actuated.

Another object of this invention is the provision of a drive device in combination with a spare tire carrier for a vehicle, wherein the drive device has a free marginal end that can be driven by a removable manual crank, with there being a rotatable housing removably affixed to the free marginal end by a lock means whereby the housing freely rotates until a key is inserted and the housing is removed, thereby preventing unauthorized manipulation of the drive device.

A further object of the present invention is the provision of a security device by which mechanism associated with a downwardly opening cavity in a vehicle that removably receives a wheel mounted spare tire therein is secured against unauthorized use. The wheel and tire are moved respective to the cavity by a retracting mechanism which is actuated by a rotatable shaft which in turn is rotated by a crank device. The shaft extends toward and is spaced from a bumper. The crank is inserted through a hole in the bumper and engages the end of the shaft. An actuating mechanism, made in accordance with the present invention, is extended through the hole in the bumper and is affixed to the end of the shaft. A rotatable housing encloses the end of the apparatus and must be unlocked in order to rotate the shaft and thereby retract and extend a spare tire from the cavity.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is an enlarged, part cross-sectional, disassembled, side elevational view of apparatus made in accordance with the present invention;

FIG. 4 is a top view of the apparatus disclosed in FIG. 3;

FIG. 5 is a broken, part cross-sectional, disassembled, side elevational view showing part of the combination of the present invention;

FIG. 6 is similar to FIG. 5 and taken 90 degrees axially therefrom; and,

FIG. 7 is a cross-sectional view taken along line 7—7 of FIG. 6.

DETAILED DESCRIPTION OF THE PREFERRED EMBODIMENT

Figure 1:
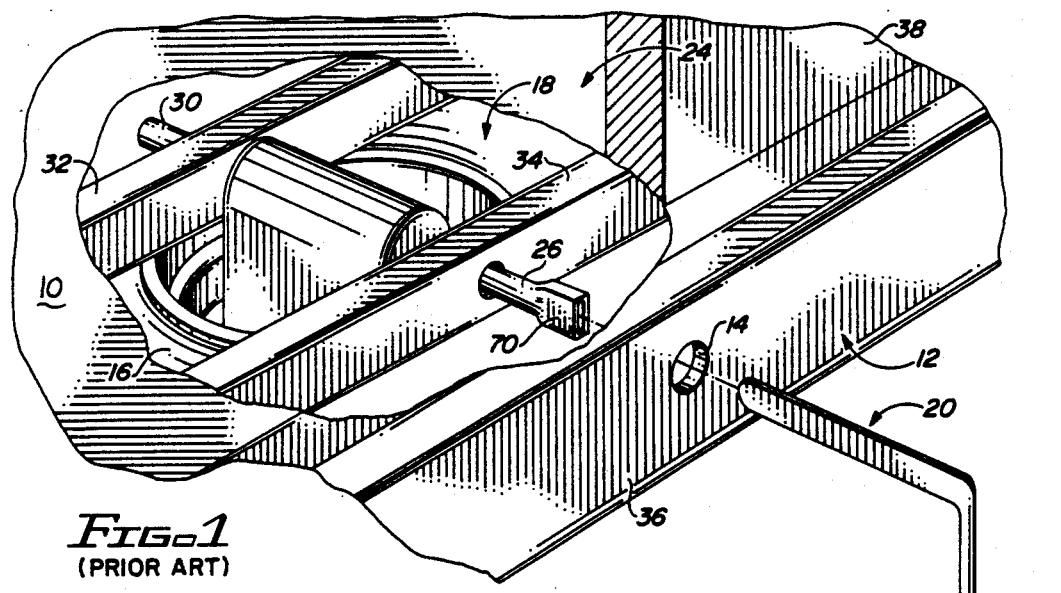
FIG. 1 is a broken, perspective view which sets forth a prior art representation of a vehicle having a rear bumper and a spare tire carrier and constitutes part of the combination of the present invention.

In FIG. 1, there is disclosed a 1989 Chevrolet pickup truck 10 having a rear bumper 12 through which an aperture 14 extends in aligned relationship with a spare tire carrier, within which a spare tire 16 can be retracted and extended. Numeral 18 indicates the location of the spare tire holder and mechanism. A prior art crank 20 is removably extended through aperture 14 and into engagement with the holder and mechanism.

Figure 2A:
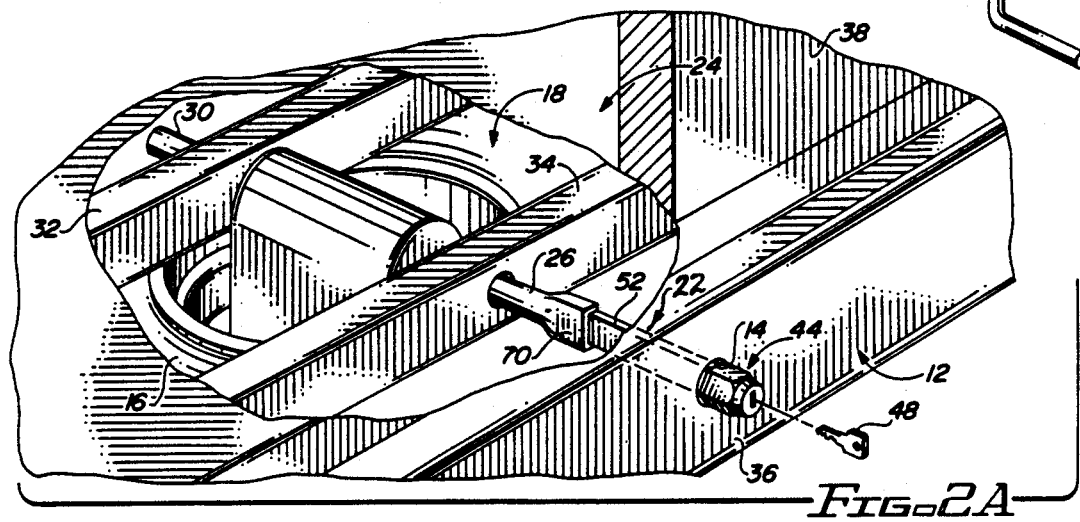
FIG. 2A and 2B are perspective, fragmentary views showing a spare tire carrier in combination with the present invention.

In FIG. 2A, there is disclosed the details of one form of a spare tire holder and mechanism 18 that can be used in combination with a drive device of the present invention 22.

Numeral 24 indicates a truck bed. Shaft 26 is part of the prior art mechanism and drives the mechanism 28 of the spare tire holder. Opposed ends 70, 30 of the shaft 26 extend through various frame members 32, 34, for example. Numeral 36 indicates part of the rear bumper. A tailgate 38 is usually mounted above the rear bumper 36.

Figure 2B:
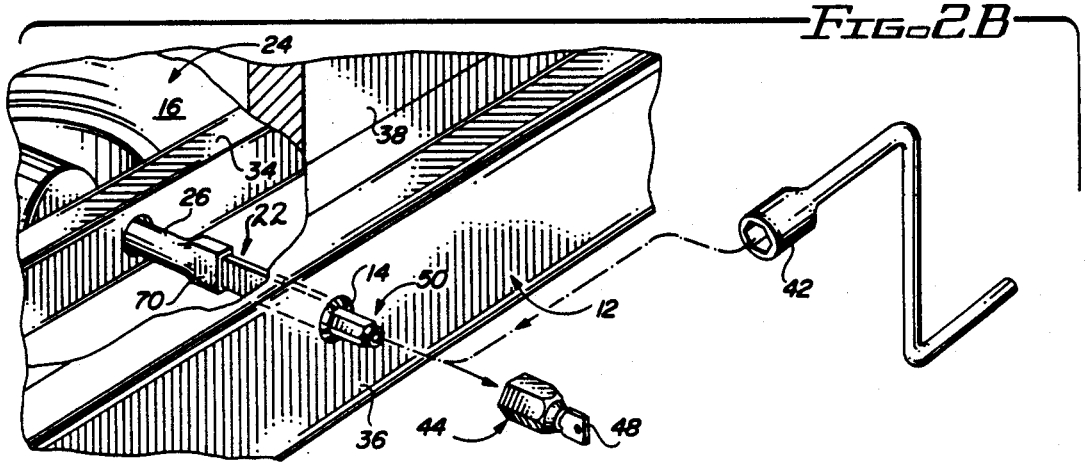

FIGS. 3 and 4 illustrate the details of the locking driver member 40 that include an ordinary crank 42 therefor (see FIGS. 2B and 3). The prior art crank 20 can be modified and used for the crank 42 if desired. Numeral 44 indicates the free wheeling end of the locking driver member 40 and includes a removable, rotatable, cylindrical housing 46 that receives a suitable key 48 within the terminal end thereof to thereby enable the housing 46 to be removed from a polygonic shape marginal end 50 of the driver member 40. The driver member 40 of the present invention includes an elongated blade 52 having a terminal end 54 opposed to the locking or free end 44.

Opposed blade faces 56, 57 are parallel to one another. Opposed edges of the blade 52 are deformed into teeth 58, 60 that form a fastener means at the attached or fastened terminal end 54 of the locking driver member 40.

In FIG. 3 it will be noted that the inner polygonic shaped drive 50 is hexagon in cross-section and is threadedly connected at 62 to the blade member 52 by the illustrated threaded coacting surfaces 64. The rotatable cylindrical housing 46 has a bore 66 formed therein of a size to slidably and rotatably receive the inner hex drive 50 therewithin. Circumferentially extending ribs 68 are formed on the inner wall surface of the hollow inner hex drive 50. The outer surface 71 of the inner hex drive 50 is a polygon in cross-sectional configuration and preferably will accept a standard size hex drive 42.

Numeral 72 indicates the inner surface of the cylindrical housing 46. A locking cylinder 74 engages the ribs 68 and prevents longitudinal movement between the cylindrical housing 46 and the inner hex drive 50, while at the same time permits the cylindrical housing 46 to be rotated axially respective to the inner hex drive 50 when in the locked configuration. Hence, rotational movement of the cylindrical housing 46 cannot rotate the blade 52.

In FIGS. 3 and 4, it will be noted that the inner hex drive 50 rotates within aperture 14 of the bumper 12 with a marginal end of the hex drive 50 extending away from the bumper 12 where it can easily be engaged with a coacting female crank device 42. The inner circumferential edge portion 47 of the cylindrical housing 46 is slightly spaced from the outer surface of the bumper 12, as seen in FIG. 4, when the locking member of the cylindrical housing 46 is locked to the inner hex drive 50.

In FIGS. 5-7, together with other figures of the drawings, there is disclosed the details of the before mentioned rotatable shaft 26, illustrating the marginal free end 78 being collapsed or oblated commencing at 76. The inner diameter 80 of the shaft 28 is circular while the marginal end at 82 is oblated due to the marginal end 78 having been deformed inwardly. The terminal end 84 of the shaft 26 is spaced from the inner surface of the bumper 12 for security reasons.

Installation of the drive device of the invention 22 onto a prior art shaft 26 is astonishingly simple and requires nothing more than a hammer or the like. The present invention is assembled as seen in FIG. 4 with the key 48 being removed therefrom. The locking driver member 40 is inserted through the bumper in the illustrated manner of FIG. 4 and the terminal end 54 fitted into the oblated hole 82 of shaft 26. The inner hex drive 50 is sharply struck with a hammer, driving the blade 56 into the oblated, marginal end 82 of the shaft, thereby forcing the deformed sidewalls of the shaft apart, while the teeth 58, 60 cut into the inner surface of the shaft 26 thereby fastening the blade 52 of the locking driver member 40 to the rotatable shaft 26. The cylindrical housing 46 is placed about the inner hex drive 50 in the manner of FIG. 4.

The housing 46, when rotated, free-wheels with respect to the inner hex drive 50; and accordingly, there is no means by which rotation of that part of the apparatus that is accessible exteriorly of the vehicle can actuate the shaft 26 in order to extend the tire from the spare tire holder 18. Accordingly, the security device provided by the present invention 22 prevents the heretofore easy access to the spare tire and wheel. The time and effort involved in operating the spare tire holder mechanism in order to steal the tire and wheel requires ingenuity and hard work so that most thieves will be discouraged from circumventing the security device of the present invention 22.

When it is necessary to retrieve the spare tire from the spare tire holder, the key 48 is inserted into the key slot located at the end 45 of the cylindrical housing 46, thereby releasing the housing 46 from the inner hex drive 50. Next, a suitable crank or proper size wrench engages the exposed inner hex drive 50 whereupon rotation of the hex drive 50 imparts rotation into the shaft 26, and extends the tire from the spare tire holder.

I claim:

1. In a vehicle having a rear bumper and a spare tire carrier, a rotatable shaft, a retracting mechanism actuated by said rotatable shaft which extends towards the rear bumper, wherein rotation of the shaft actuates the retracting mechanism and lifts and extends a wheel mounted spare tire respective to the spare tire carrier; the shaft can be engaged by a crank which can be attached thereto and rotated to actuate the retracting mechanism and thereby retract and extend the spare tire respective to the spare tire carrier, the combination with the retracting mechanism of a drive device by which the shaft can be rotated:

said drive device has opposed marginal ends, drive means on one of said opposed ends of said drive device and attachment means on the other of said oppossed ends of said drive device; said drive device is affixed to the shaft by said attachment means;

said drive means has an inner drive member which is adapted to be engaged by a crank and thereby enable said drive device member to be rotated; a cover removably received about said inner drive member, lock means by which said cover and said inner drive member are rotatably fastened together with said cover rotatably receiving said inner drive member therein to thereby place said drive device in a locked configuration;

whereby; said cover can be removed from said drive device and thereby place said drive device in an unlocked configuration, whereupon said inner drive member can be engaged by a crank and rotated, thereby rotating the shaft of the retracting mechanism and lifting and/or extending the spare tire respective to the spare tire carrier.

2. The combination of claim 1 wherein the shaft has a marginal end and has an oblated bore in the marginal end thereof; said attachment means of said drive device in non-circular and is tightly received within the bore of the shaft to thereby engage the rotatable shaft whereby rotation of the drive device with a crank imparts rotation into the rotatable shaft.

3. The combination of claim 1 wherein said inner drive member is in cross-section, a polygon and said cover is rotatably received about said polygon.

4. The combination of claim 1 wherein said inner drive member is a hexagon and forms one marginal end of said drive device, and said cover is mounted for rotation about said hexagon when the lock means attaches the cover to the drive device in a removable manner.

5. The combination of claim 1 wherein the rotatable shaft is hollow, and one end thereof is deformed into an oblong configuration; said attachment means is snugly received within the deformed end of the hollow shaft; said inner drive member is adapted to extend though the bumper.

6. The combination of claim 1 wherein said inner drive member is in cross-section, a polygon; and, said cover is cylindrical and is removably received about said polygon and prevents access to said polygon to thereby prevent said inner drive member from being engaged and rotated.

7. A vehicle having an outwardly opening cavity for receiving a wheel mounted spare tire therein, a retracting mechanism including a rotatable shaft by which the wheel mounted spare tire is retracted into the cavity when the shaft is rotated in one direction and extended from the cavity when rotated in the other direction; wherein the shaft has an end which is adapted to removably receive a crank device whereby the shaft can be rotated to retract and to extend the wheel mounted spare tire respective to the cavity; the improvement comprising:

a drive device by which the ° shaft of the retracting mechanism can be rotated; said drive device has opposed ends, attachment means by which one end of said drive device can be affixed to the end of the shaft, the other end of the said drive device has a crank engaging means formed thereon; a housing within which said crank engaging means can be received; lock means by which said housing is rotatably mounted about said other end of said drive device and thereby placing said drive device in a locked configuration wherein said housing cannot be moved axially respective to said crank engaging means and to thereby prevent access to said crank engaging means; whereby;

said lock means releases said housing from attached relationship respective to said crank engaging means when said lock means is in an unlocked configuration, to thereby enable the crank engaging means to be engaged and rotated by a crank device.

8. The improvement of claim 7 wherein the shaft has an oblated bore in a marginal end thereof; said attachment means is received within the bore and attaches the drive device to the shaft.

9. The improvement of claim 7 wherein said crank engaging means of said drive device is in cross-section, a polygon and said housing is rotatably received about said polygon when said drive device is in the locked configuration.

10. The improvement of claim 7, wherein a hexagon drive is formed at said one end of said drive device, said housing rotatably encloses said hexagon drive when in the locked configuration.

11. The improvement of claim 7 wherein the end of the shaft is hollow and is deformed into an oblated configuration;

said attachment means of said drive device is drivingly received within said deformed end of the hollow shaft; and said attachment means has a longitudinal axis, said housing is rotatably mounted about the longitudinal axis of said drive device when said lock means removably fastens said housing about the crank engaging means of said drive device.

12. The improvement of claim 7 wherein said crank engaging means is, in lateral cross-section, a polygon; and, said housing is removably received about said polygon by said lock means; said housing is rotatable when said lock means mounts the rotatable housing about said polygon, whereby access to the crank engaging means is prevented when the housing is secured against axial movement on the drive device.

13. In a holder formed within a vehicle chassis for receiving a wheel mounted spare tire therein where in a rotatable shaft is connected to a shaft driven retracting mechanism which raises the wheel mounted spare tire into the holder when the shaft is rotated in one direction and lowers the wheel mounted spare tire from the holder when the shaft is rotated in the other direction, the combination with said retracting mechanism of a locking drive device by which one end of the shaft is selectively rotated;

said locking drive device has a locking drive member, said locking drive member has opposed ends with there being an oblated end opposed to an inner drive member at the other end, a rotatable housing enclosing said inner drive member, lock means for removably securing said housing against axial movement respective to said locking drive member, and for rotation about said inner drive member, said oblated end is made a into configuration to be received in attached relationship by the shaft of the retracting mechanism;

whereby, said oblated end of said locking drive member can be attached to the end of the shaft; said housing can be removed from said inner drive member, whereupon said inner drive member can be engaged by a crank means to thereby rotate the shaft and lower the wheel mounted spare tire from the holder; and thereafter a wheel mounted spare tire can be raised by the holder by rotating the shaft of the retracting mechanism.

14. The combination of claim 13 wherein the rotatable shaft has an oblated bore formed in one marginal end thereof; said oblated end of the locking drive member is made complementary respective to the oblated bore and is received within the bore.

15. The combination of claim 14 wherein said inner drive member forms a marginal end of said locking drive member and is in cross-section, a polygon, and said housing is rotatably received about said polygon.

16. The combination of claim 13 wherein a hexagon is formed at one said end of said locking drive member and said rotatable housing is received about said hexagon.

17. The combination of claim 13 wherein an end of the shaft is hollow and deformed; said one end of the locking drive member is oblated and drivingly received within the deformed end of the shaft; and the rotatable housing encloses the inner drive member of the locking drive member and is held against axial movement when secured thereon by said lock means.

18. The combination of claim 13 wherein said inner drive member is, in cross-section, a polygon and said housing is rotatably received about said polygon.

* * * * *